they are not critical and are mentioned in order

3,277,192
PREPARATION OF HEXAFLUOROBENZENE AND FLUOROCHLOROBENZENES

Harold Crosbie Fielding, Northwich, England, assignor to Imperial Chemical Industries Limited, London, England, a corporation of Great Britain
No Drawing. Filed Dec. 11, 1963, Ser. No. 329,899
Claims priority, application Great Britain, Dec. 19, 1962, 47,997/62
6 Claims. (Cl. 260—650)

This invention relates to a process for making hexafluorobenzene and fluorochlorobenzenes, particularly those having the general formula $C_6F_nCl_{6-n}$ in which $n$ is 5 or 4.

Application S.N. 302,727, now U.S. Patent 3,231,625, describes a process in which tetrafluorodichlorobenzene and trifluorotrichlorobenznee on being heated to temperatures above 600° C. disproportionate to give other fluorochlorobenzenes, and small yields of hexafluorobenzene less than 5% by weight. Aluminum fluoride catalyses these disproportionations and they are conveniently achieved by conveying the reactant fluorochlorobenzene in a stream of nitrogen through a heated tube.

It has now been found that if fluorochlorobenzenes are heated in contact with a molten salt mixture containing one or more alkali metal fluorides, they undergo fluorination as well as disproportionation, and as a result hexafluorobenzene and pentafluorochlorobenzene and tetrafluorodichlorobenzene can be obtained in higher yield than by the process of application Serial No. 302,727.

According to this invention there is provided a process for making hexafluorobenzene and fluorochlorobenzenes comprising heating a fluorochlorobenzene chosen from pentafluorochlorobenzene, tetrafluorodichlorobenzene and trifluorotrichlorobenzene in contact with a mixture of molten salts of which at least one is an alkali metal fluoride, said salts being selected from the group consisting of chlorides and fluorides of alkali metals and alkaline earth metals and borofluorides of alkali metals.

Alkali metal fluorides and chlorides suitable for use in the process are those of lithium, sodium and potassium; of the borofluorides those of sodium and potassium are preferred, and of the alkaline earth salts calcium fluoride and calcium chloride are suitable. Examples of melts are those of $KF/KBF_4$, $KF/NaCl$, $KF/KCl$, $KF/LiF$, $KF/NaF$, $KF/LiF/NaF$, $NaF/LiF$, $NaF/NaCl$, $NaF/KCl$, $KF/CaF_2$, $NaF/CaF_2$, $NaF/CaCl_2$. Particularly effective are melts composed of $KF/KCl$ or $KF/KBF_4$.

The temperature of the melt with which the reactant fluorochlorobenzene is brought into contact is in the range from about 500° C. to 900° C., preferably from 700° C. to 800° C. Reaction can begin at about 500° C. but good yields are not achieved until the temperature reaches about 700° C. On the other hand, at temperatures approaching 800° C. some decomposition of fluorochlorobenzenes may set in and above about 850° C. the degree of decomposition becomes appreciable. Thus, from 700° C. to 800° C. is the optimum temperature range for satisfactory yields and convenient reaction velocities and absence of significant amounts of decomposition products.

The reactant fluorochlorobenzene can be contacted with the melt by passing it over the molten surface whilst the latter is static, or the melt can be agitated. In another method the melt can be supported on an inert material to give it a form of granular structure. The flow rates given in the examples correspond to residence times of the fluorochlorobenzene in the hot reaction zone over the melt of three to five minutes. The reactant fluorochlorobenzene can also be bubbled through the melt and under these conditions the contact time with the melt is of the order of one to two seconds and the residence time in the hot zone over the melt about thirty seconds. These times are not critical and are mentioned in order to indicate the order of magnitude of the reaction times. The longer the residence time the greater is the degree of disproportionation compared with fluorination. Thus one can expect less disproportionation when the reactant fluorochlorobenzene is bubbled through the melt.

The elevated temperature and the action of the melts limit the choice of material that can be used to construct the reaction vessel. Graphite and platinum are satisfactory. Nickel, though able to resist the action of the melt, is sufficiently reactive at 750° C. and above to abstract halogen from the chlorofluorobenzene. Graphite, though sufficiently inert, is somewhat too brittle to be used for the gas-inlet pipes, and for these platinum is to be preferred. A combination of a graphite-lined nickel pot reactor to hold the melt, and platinum inlet pipes and thermocouple sheaths is suitable. The life of the graphite lining is limited owing to a slow denaturing, possibly by loss of bonding agent, which occurs only above the surface of the melt. No change in the graphite appears to occur where it is in contact with the melt.

The products of the reaction are conveniently collected by condensing them in one or more cold traps and subsequently separating them by fractional distillation or vapour-phase chromatography methods.

The invention is illustrated by the Examples 1–14 of which Nos. 1–6 refer to experiments in which the reactant fluorochlorobenzene was passed over the melt. In Examples 7–14 the reactant was bubbled through the melt. Example 15 is included for comparison with Examples 11 and 12 to indicate the degree of disproportionation. Comparison of Examples 13 and 14 with 11 and 12 indicates that the degree of fluorination is not very sensitive to variation in fluoride content of the melt.

In Examples 1–6 the liquid reactant fluorochlorobenzene was injected into a stream of nitrogen at atmospheric pressure which was then passed over the melt. The flow rate of nitrogen was 4 litres/hour. The melt was supported in an elongated nickel boat of semi-circular cross-section, 20 inches long and one inch in diameter, heated in a long horizontal electric furnace.

In Examples 7–15 the melt was contained in a graphite-lined nickel vessel heated in an electric furnace, and the reactant fluorochlorobenzene conveyed in a stream of nitrogen to the bottom of the melt by means of a platinum tube. The nickel vessel was 2 inches internal diameter and 9 inches deep and the graphite lining had a wall thickness of ¼ inch. The vessel had a close-fitting nickel lid carrying a thermocouple and inlet and exit tubes and gas-tight seals were made where necessary by means of sodium silicate solution. The flow rate of nitrogen was 100 mls./minute and the depth of melt through which the gas stream bubbled was 4½ inches. There was dead space at the top of the reaction vessel 3 inches in length.

In all examples the reaction products were collected in traps cooled in liquid air and subsequent separated and estimated by vapour-phase chromatography.

Examples 1–4

In these examples the reactant fluorochlorobenzene was $C_6F_4Cl_2$ of which about 80% was the 1,3 isomer. The flow rate of the nitrogen stream was 4 litres/hour and the $C_6F_4Cl_2$ was injected uniformly over one hour. The recovery of products was about 80% by weight.

| No. | Wt. of $C_6F_4Cl_2$ (g.) | Melt composition, percent molar | Temp., °C. | Products, percent wt. | | | |
|---|---|---|---|---|---|---|---|
| | | | | $C_6F_6$ | $C_6F_5Cl$ | $C_6F_4Cl_2$ | $C_6F_3Cl_3$ |
| 1 | 25 | 20 KF, 80 KBF$_4$ | 650 | 10 | 30 | 60 | --------- |
| 2 | 25 | 20 KF, 80 KBF$_4$ | 800 | 38 | 40 | 19 | 3 |
| 3 | 20 | 40 KF, 60 KCl | 700 | 20 | 38 | 40 | 2 |
| 4 | 20 | 40 KF, 60 KCl | 800 | 25 | 49 | 22 | 4 |

*Examples 5–6*

In these examples the reactant fluorochlorobenzene was sym-trifluorotrichlorobenzene, $C_6F_3Cl_3$, and the nitrogen flow rate was 4 litres/hour. The $C_6F_3Cl_3$ was injected uniformly over one hour and the recovery of products was about 80% by weight.

| No. | Wt. of $C_6F_3Cl_3$ (g.) | Melt composition, percent molar | Temp., °C. | Products, percent wt. | | | |
|---|---|---|---|---|---|---|---|
| | | | | $C_6F_6$ | $C_6F_5Cl$ | $C_6F_4Cl_2$ | $C_6F_3Cl_3$ |
| 5 | 20 | 20 KF, 80 KBF$_4$ | 800 | 24 | 48 | 22 | 6 |
| 6 | 20 | 40 KF, 60 KCl | 800 | 20 | 45 | 27 | 8 |

*Examples 7–15*

In each of these examples the temperature of the melt was 780° C. the nitrogen flow rate 6 litres/hour, and the fluorochlorobenzene injected uniformly over 1 hour.

| No. | Wt. of fluorochlorobenzene | Melt composition, percent molar | Recovery, percent weight | Products, percent wt. | | | | |
|---|---|---|---|---|---|---|---|---|
| | | | | $C_6F_6$ | $C_6F_5Cl$ | $C_6F_4Cl_2$ | $C_6F_3Cl_3$ | $C_6F_2Cl_4$ |
| 7 | $C_6F_5Cl$—15 g | 45 KF, 55 KCl | 72 | 11 | 82 | 7 | --------- | --------- |
| 8 | $C_6F_5Cl$—15.5 g | 45 KF, 55 KCl | 75 | 12 | 86 | 2 | --------- | --------- |
| 9 | $C_6F_4Cl_2$—15 g | 45 KF, 55 KCl | 78 | 3 | 18 | 73 | 6 | --------- |
| 10 | $C_6F_4Cl_2$—13 g | 45 KF, 55 KCl | 78 | 4 | 18 | 74 | 4 | --------- |
| 11 | $C_6F_3Cl_3$—16 g | 45 KF, 55 KCl | 79 | 1 | 3 | 15 | 77 | 4 |
| 12 | $C_6F_3Cl_3$—14.4 g | 45 KF, 55 KCl | 86 | 1 | 4 | 16 | 74 | 5 |
| 13 | $C_6F_3Cl_3$—16.4 g | 30 KF, 70 KCl | 87 | Trace | 2 | 14 | 78 | 6 |
| 14 | $C_6F_3Cl_3$—16 g | 55 KF, 45 KCl | 81 | Trace | 4 | 17 | 68 | 11 |
| 15 | $C_6F_3Cl_3$—16 g | 50 NaCl, 50 KCl | 97 | Trace | <1 | 4 | 85 | 10 |

In application S.N. 282,597 there is described a process for making fluorochlorobenzenes having the molecular formula $C_6F_nCl_{6-n}$, where $n$ is an integer from 1 to 6, comprising heating hexachlorobenzene at a temperature of at least 100° C. with an alkali metal fluoride in a polar non-proton-donating liquid organic reaction medium that is inert towards the reactants, for example tetramethylene sulphone. The tetrafluorodichlorobenzene made by this process is found to consist of the ortho and meta isomers in the respective proportions of about 20% and 80% by weight, the proportion of the para isomer being insignificant. By the process of the present invention using trifluorotrichlorobenzene as starting reactant fluorochlorobenzene it has been found that the tetrafluorodichlorobenzene formed consists of all three isomers in the proportions of about 20% ortho, 60% meta and 20% para by weight. The process is thus useful not only for making various fluorochlorobenzenes and hexafluorobenzene, which are important starting materials for the synthesis of pharmaceuticals, dyestuffs and polymers containing fluorinated aromatic rings, but also for making the particular fluorochlorobenzene, namely para-tetrafluorodichlorobenzene, which as far as presently known is not formed in significant amounts by other known processes.

What is claimed is:

1. A process for making at least one aromatic fluorine compound selected from the group consisting of hexafluorobenzene and fluorochlorobenzenes comprising contacting a fluorochlorobenzene chosen from pentafluorochlorobenzene, tetrafluorodichlorobenzene and trifluorotrichlorobenzene with a mixture of molten salts whose temperature is from 500° C. to 900° C. of which at least one is an alkali metal fluoride, said salts being selected from the group consisting of chlorides and fluorides of alkali metals and alkaline earth metals and borofluorides of alkali metals, condensing the gaseous products issuing from the reaction system and recovering said aromatic fluorine compound.

2. A process as claimed in claim 1 in which the temperature of the mixture of molten salts is from 700° C. to 800° C.

3. A process as claimed in claim 1 in which the salts for the molten mixture are chosen from the group consisting of fluorides and chlorides and borofluorides of sodium and potassium and the temperature of the molten mixture with which the fluorochlorobenzene is contacted is from 700° C. to 800° C.

4. A process as claimed in claim 1 in which the molten mixture of salts is composed of potassium fluoride and potassium chloride and its temperature is from 700° C. to 800° C.. when contacted with the fluorochlorobenzene.

5. A process as claimed in claim 1 in which the molten mixture of salts is composed of potassium fluoride and potassium borofluoride, and its temperature is from 700° C. to 800° C. when contacted with the fluorochlorobenzene.

6. Process for making the para isomer of tetrafluorodichlorobenzene comprising contacting trifluorotrichlorobenzene with a molten mixture of salts whose temperature is from 700° C. to 800° C., said salts being chosen from the group consisting of fluorides, chlorides and borofluorides of sodium and potassium, and at least one salt in the mixture being a fluoride, condensing the gaseous products issuing from the reaction system, separating tetrafluorodichlorobenzene from the condensate and fractionating it to obtain the said para isomer.

References Cited by the Examiner

Finger et al.: "Resume Des Comm. Division de Chimie Org.," vol. II, p. 303 (1957).

LEON ZITVER, *Primary Examiner.*

K. H. JOHNSON, K. V. ROCKEY, *Assistant Examiners.*